United States Patent
Ito (10) Patent No.: US 10,263,562 B2
(45) Date of Patent: Apr. 16, 2019

(54) ELECTRICAL APPARATUS

(71) Applicant: Brother Kogyo Kabushiki Kaisha, Nagoya-shi, Aichi-ken (JP)

(72) Inventor: Ryo Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 200 days.

(21) Appl. No.: 14/995,372

(22) Filed: Jan. 14, 2016

(65) Prior Publication Data

US 2016/0211780 A1  Jul. 21, 2016

(30) Foreign Application Priority Data

Jan. 15, 2015  (JP) ................................. 2015-005907

(51) Int. Cl.
   H02P 29/60 (2016.01)
(52) U.S. Cl.
   CPC ................................... H02P 29/60 (2016.02)
(58) Field of Classification Search
   CPC ................................... H02P 3/02; H02P 29/60
   USPC ....................................................... 318/362
   See application file for complete search history.

(56) References Cited

U.S. PATENT DOCUMENTS

| 7,471,003 | B2 * | 12/2008 | Kobayashi | B60K 6/48 290/40 C |
| 9,091,600 | B2 * | 7/2015 | Senoo | G01K 7/22 |
| 9,234,803 | B2 * | 1/2016 | Cheng | H02H 6/005 |
| 2008/0054833 | A1 * | 3/2008 | Ando | H02H 7/0833 318/473 |
| 2008/0218112 | A1 * | 9/2008 | Beifus | G05B 23/0264 318/490 |
| 2012/0001574 | A1 * | 1/2012 | Akaishi | H02P 21/06 318/400.04 |
| 2013/0110449 | A1 * | 5/2013 | Cheng | H02H 6/005 702/132 |
| 2013/0147407 | A1 * | 6/2013 | Kawamura | H03K 17/0828 318/400.21 |
| 2014/0354204 | A1 * | 12/2014 | Tachibana | H02P 6/08 318/473 |

(Continued)

FOREIGN PATENT DOCUMENTS

| JP | H03-22819 A | 1/1991 |
| JP | H1091253 A | 4/1998 |
| JP | 2009-187423 A | 8/2009 |

(Continued)

OTHER PUBLICATIONS

Nov. 21, 2017—(JP) Notice of Reasons for Rejection—App 2015-005907.

*Primary Examiner* — Kawing Chan
(74) *Attorney, Agent, or Firm* — Banner & Witcoff, Ltd.

(57) ABSTRACT

An electrical apparatus mounting a motor includes a controller and an electrically data rewritable non-volatile storage. The controller is configured to execute: a temperature calculation process in which in a case that a state of the motor is switched from a driven state to a stopped state, the controller calculates a temperature of the motor based on rotation of the motor; and a temperature storing process in which the controller stores, in the storage, the temperature, which has been calculated at the time of the switch operation in the temperature calculation process, as a peak temperature, together with an absolute time clocked at the time of the switch operation.

12 Claims, 10 Drawing Sheets

(56) References Cited

U.S. PATENT DOCUMENTS

2016/0141999 A1\* 5/2016 Han .................. H02P 21/00
                                                                                                                            318/473

FOREIGN PATENT DOCUMENTS

| JP | 2009-189423 A | 8/2009 |
| JP | 2010-134407 A | 6/2010 |
| JP | 2012-065520 A | 3/2012 |
| JP | 2012-095415 A | 5/2012 |

\* cited by examiner

ELECTRICAL APPARATUS

CROSS REFERENCE TO RELATED APPLICATION

The present application claims priority from Japanese Patent Application No. 2015-005907 filed on Jan. 15, 2015, the disclosure of which is incorporated herein by reference in its entirety.

BACKGROUND

Field of the Invention

The present invention relates to an electrical apparatus mounting a motor.

Description of the Related Art

There are conventionally known electrical apparatuses which drive a motor to convey a sheet. Such electrical apparatuses include, for example, an image forming apparatus forming an image on a sheet and a reading apparatus reading a sheet (document).

Further, there are known protective apparatuses which calculate a load temperature from a current flowing in the load. Such protective apparatuses include, for example, a protective apparatus which calculates a load temperature at regular time intervals and writes, in a non-volatile memory, the calculated load temperature and the current time obtained from an internal clock (for example, see Japanese Patent Application laid-open No. 2012-65520). In a case of power failure, this protective apparatus calculates a load temperature at a recovery time based on information of the temperature and the time stored in the non-volatile memory.

SUMMARY

The non-volatile memory such as a flash memory has a limit of the number of times of data writing. Thus, according to the conventional technology in which the temperature and the time are written in the non-volatile memory at regular time intervals, performing the data writing at shorter intervals shortens the service life of the non-volatile memory. Meanwhile, when the writing of the temperature and the time is performed at long time intervals, the following situation may occur. Namely, in a case of power source loss caused by sudden power failure, an accident in which a power plug is yanked out of a socket, or the like, temperature information is not stored in the non-volatile memory. This may cause a great temperature error when the temperature calculation is performed at the recovery time.

SUMMARY OF THE INVENTION

Thus, a technology, which is capable of appropriately writing a temperature and time in a non-volatile storage, is expected to be provided.

An electrical apparatus according to an aspect of the present teaching is an electrical apparatus mounting a motor. The electrical apparatus includes a controller and a storage. The storage is an electrically data rewritable non-volatile storage. The controller is configured to execute a temperature calculation process in which in a case that a state of the motor is switched from a driven state to a stopped state, the controller calculates a temperature of the motor based on rotation of the motor.

The controller is configured to further execute a temperature storing process in which the controller stores, in the storage, the temperature, which has been calculated at the time of the switch operation in the temperature calculation process, as a peak temperature, together with an absolute time clocked at the time of the switch operation.

The change in temperature after stoppage of the motor can be calculated based on a time elapsed after the peak temperature more easily than the change in high temperature, which depends on the driven state of the motor. Thus, the electrical apparatus of the present teaching can appropriately store, in the storage, information of the temperature and the time which is required for accurate temperature calculation after the sudden power source loss while reducing the number of times of data writing in the storage. Therefore, the electrical apparatus of the present teaching can reduce the influence of a temperature calculation error, which is caused by the sudden power source loss.

DESCRIPTION OF THE EMBODIMENTS

Figure 1:
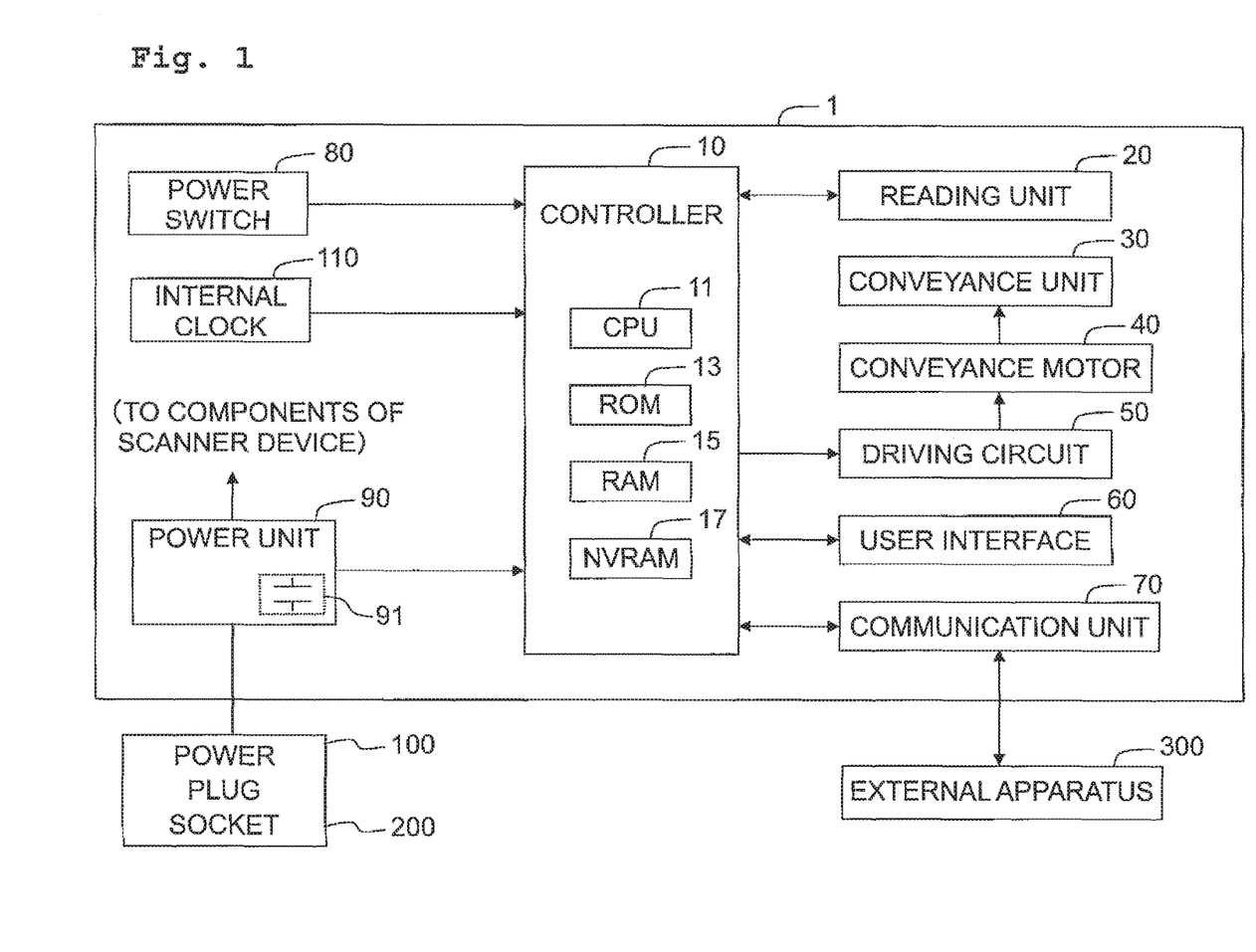
FIG. 1 is a block diagram of a configuration of a scanner device.

Hereinbelow, an explanation will be made about embodiments of the present teaching with reference to drawings. A scanner device 1 according to this embodiment depicted in FIG. 1 is a scanner device of an automatic document feeder (ADF) type which optically reads a document as a reading target at a predetermined position. The scanner device 1 includes a controller 10, a reading unit 20, a conveyance unit 30, a conveyance motor 40, a driving circuit 50, a user interface 60, a communication unit 70, a power switch 80, a power unit 90, a power plug 100 connected to the power unit 90 through a cable, and an internal clock 110.

The scanner device 1 operates in response to power supply from the outside through the power plug 100 plugging into an indoor socket 200. Alternating-current power (AC power) supplied through the power plug 100 is appropriately converted into direct-current power (DC power) by the power unit 90. The converted DC current is supplied to parts or components of the scanner device 1.

The controller 10 operates in response to power supply from the power unit 90, and controls the parts or components of the scanner device 1 in an integrated manner. The controller 10 includes a CPU 11, a ROM 13, a RAM 15, and a NVRAM 17. The CPU 11 performs processes according to programs stored in the ROM 13. The RAM 15 is used as a working memory when each of the processes is executed by the CPU 11. The NVRAM 17 is an electrically data rewritable non-volatile storage. In this embodiment, the NVRAM 17 is a flash memory.

The reading unit 20 is configured to optically read each document, which is conveyed by the conveyance unit 30, in a main scanning direction orthogonal to a document conveyance direction. The reading unit 20 is disposed at a predetermined position on a document conveyance path of the conveyance unit 30. The reading unit 20 includes, for example, a contact image sensor.

The controller 10 controls the reading unit 20 to read each line of the document. This reading operation is performed repeatedly. The reading unit 20 inputs the read image data of each line created or generated by the reading operation to the controller 10. The controller 10 processes the read image data of each line into the image data of the document. Then, the controller 10 provides the image data of the document to an external apparatus 300 via the communication unit 70.

The conveyance unit 30 is configured to separate documents stacked on a feed tray one by one and to convey the separated document as the reading target to a reading position of the reading unit 20. The conveyance unit 30 is driven by the conveyance motor 40. The conveyance unit 30 includes rollers, each of which has a rotating shaft orthogonal to the document conveyance direction, on the document conveyance path ranging from the feed tray to a discharge tray. The conveyance unit 30 rotates each of the rollers in response to power from the conveyance motor 40, thereby conveying each document from the feed tray to the discharge tray. The reading position of the reading unit 20 is set on the document conveyance path ranging from the feed tray to the discharge tray.

The conveyance motor 40 is driven by the driving circuit 50. The driving circuit 50 is configured to drive the conveyance motor 40 in response to a control signal inputted from the controller 10. When the conveyance motor 40 is a direct-current motor (DC motor), a rotary encoder (not depicted) can be provided in the rotating shaft of each of the rollers or the rotating shaft of the conveyance motor 40. Further, a detection unit (not depicted) can be provided. The detection unit detects, based on an encoder signal from the rotary encoder, a rotation amount of each of the rollers or the conveyance motor 40 which corresponds to a conveyance amount of the document. In this case, the controller 10 may execute feedback control of the conveyance motor 40 based on the information of the rotation amount (conveyance amount of the document) obtained from the detection unit, thereby controlling the conveyance operation of the document which is performed by the conveyance unit 30. As another example, the conveyance motor 40 may be a step motor.

The user interface 60 includes a display and an operation part. The user interface 60 is configured to display or show an information screen for a user on the display and to receive a user's command via the operation part. The display is, for example, a liquid crystal display. The operation part includes, for example, a touch panel on the liquid crystal display. The controller 10 executes a process for reading the document disposed in the feed tray in accordance with the reading command which is inputted by the user through the user interface 60.

The communication unit 70 is configured to be communicable with the external apparatus 300 such as a personal computer. The controller 10 communicates with the external apparatus 300 via the communication unit 70. For example, the controller 10 transmits image data to the external apparatus 300 and receives a command from the external apparatus 300 via the communication unit 70. The communication unit 70 may include, for example, at least one of a USB interface, a wired LAN interface, and a wireless LAN interface to communicate with the external apparatus 300.

The power switch 80 is configured to receive a power on/off operation performed by the user and to input a power on/off signal as its operation signal to the controller 10. The internal clock 110 is configured to perform a clocking operation by an internal battery provided for clocking, even when no power is supplied from the power plug 100. The internal clock 110 clocks the absolute time. The absolute time may be the time on the basis of Coordinate Universal Time (UTC).

Figure 2:
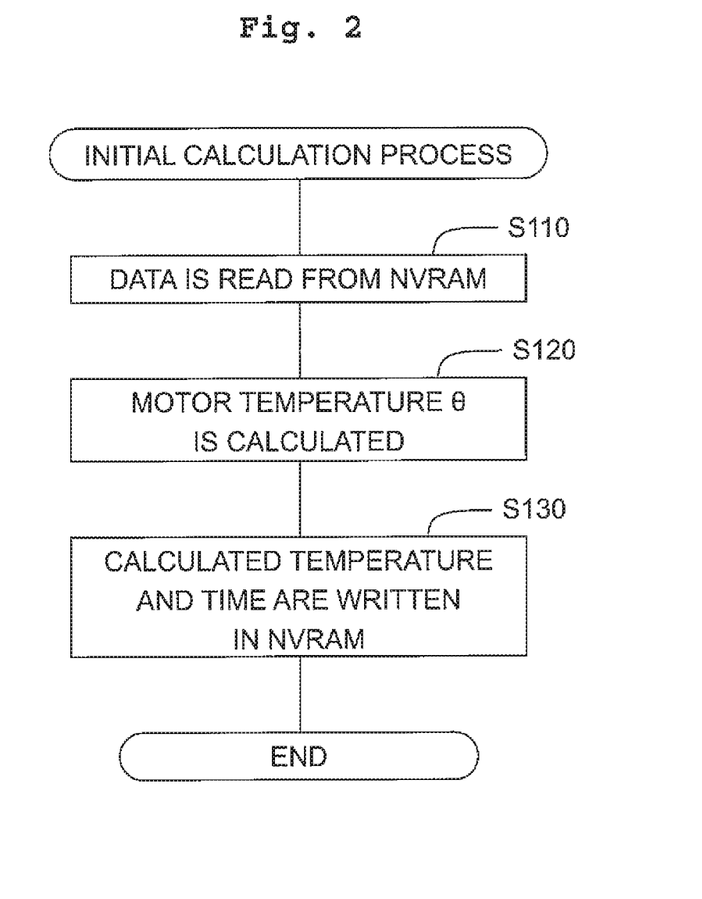
FIG. 2 is a flowchart showing an initial calculation process executed by a controller.

Subsequently, an explanation will be made about details of an initial calculation process executed by the controller 10 with reference to FIG. 2. The initial calculation process is executed by the CPU 11 at an initial operation time of the controller 10. In the following explanation, for the purpose of making the explanation easier, the controller 10 is regarded as an operating body of the processes executed by the CPU 11.

The phrase "at the initial operation time" in this context includes an activation time of the controller 10 in response to power supply from the power plug 100, an activation time of the controller 10 in response to a power-on operation for the power switch 80, and a recovery time of the controller 10 from a sleep mode. The initial calculation process can be performed at one or more of point(s) in time of the above cases. In this embodiment, the scanner device 1 may be configured such that the controller 10 is activated in response to power supply from the power plug 100 and then executes the initial calculation process. Or, the scanner device 1 may be configured as follows. Namely, when the power-on operation for the power switch 80 is performed so that its power-on signal is inputted from the power switch 80 to the controller 10, the controller 10 is activated and then executes the initial calculation process, instead of allowing the controller 10 to be activated in response to power supply from the power plug 100.

When starting the initial calculation process, the controller 10 reads temperature data stored in the NVRAM 17 from the NVRAM 17 (S110). The temperature data is updated in a temperature storing process and a device monitoring process which will be described later. The temperature data includes the temperature of the conveyance motor 40 at a point of time in the past and the calculation time of the temperature of the conveyance motor 40. In this embodiment, the controller 10 calculates the temperature of the conveyance motor 40 on the basis of a driving amount of the conveyance motor 40 and an elapsed time after the conveyance motor 40 is stopped. The temperature data includes the temperature of the conveyance motor 40 calculated by the controller 10 and the calculation time thereof. In the following, the temperature of the conveyance motor 40 is to be referred to as "motor temperature". The motor temperature in the temperature data is to be referred to as "motor temperature $\theta P$" and its calculation time is to be referred to as "time Tp". The calculation time Tp of the motor temperature $\theta P$ in the temperature data is based on the absolute time clocked by the internal clock 110.

After reading the temperature data, the controller 10 calculates the current motor temperature $\theta$ on the basis of the motor temperature $\theta p$ and the time Tp in the temperature data and the current time T clocked by the internal clock 110 (S120). The current motor temperature $\theta$ is calculated, for example, in accordance with the following formula.

$$\theta = \theta p - K \cdot \Delta T$$

A coefficient K in the formula is a heat dissipation coefficient. A value $\Delta T$ is an elapsed time after the time Tp in the temperature data until the current time T and the value $\Delta T$ satisfies the equation "$\Delta T = T - Tp$". In S120, the current motor temperature $\theta = F(\theta p, \Delta T)$ may be calculated in accordance with a function $F(\theta p, \Delta T)$ which has been determined in a test in advance. The function $F(\theta p, \Delta T)$ can be determined, for example, by the exponential function to converge on atmospheric temperature.

After calculating the motor temperature θ, the controller 10 writes the calculated motor temperature θ and the calculation time T in the NVRAM 17. The calculated motor temperature θ and the calculation time T are written as the motor temperature θp and the time Tp respectively. Accordingly, the temperature data stored in the NVRAM 17 is updated (S130). After that, the initial calculation process is completed.

Figure 3:
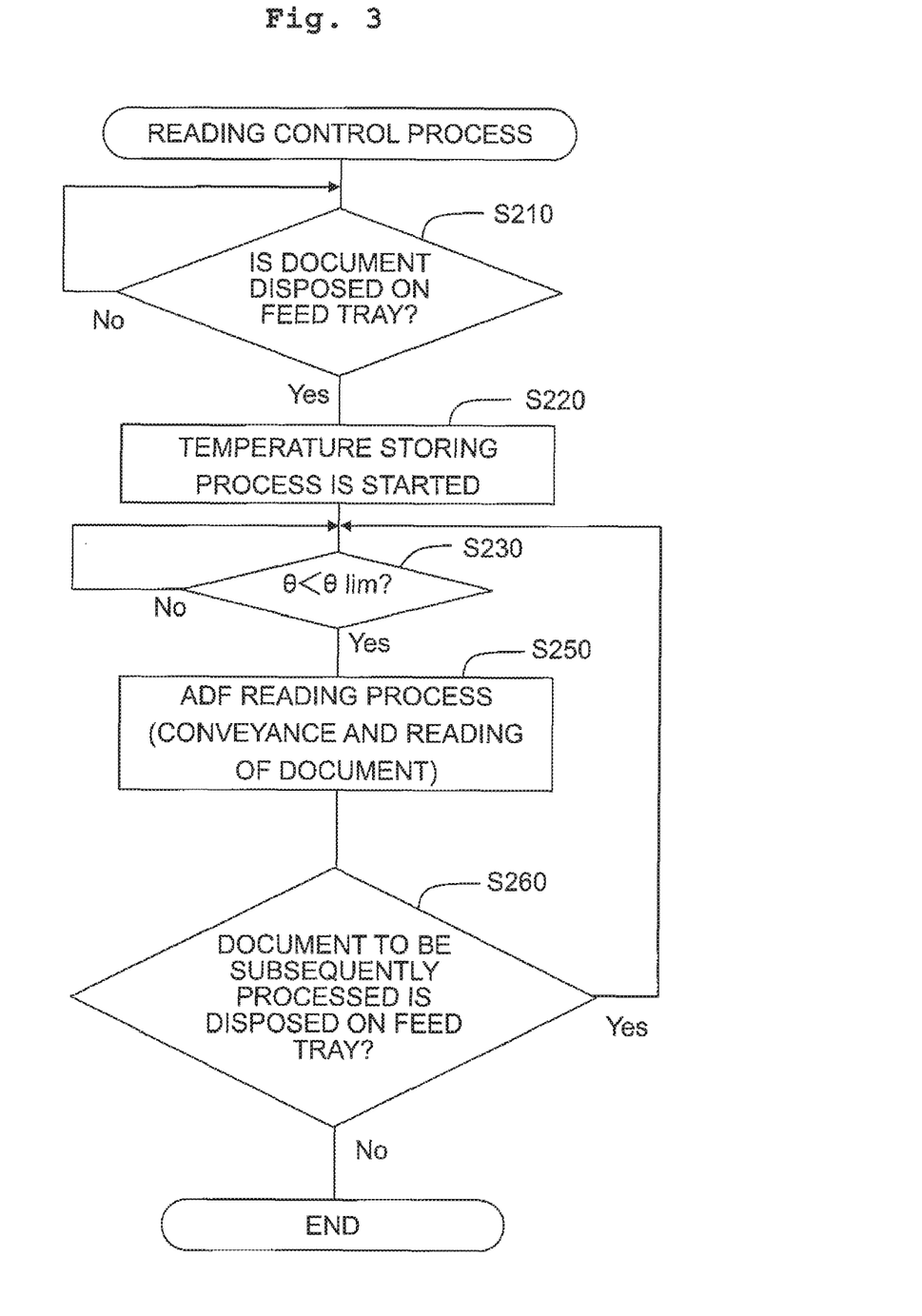
FIG. 3 is a flowchart showing a reading control process executed by the controller.

Subsequently, a reading control process, which is executed by the controller 10 upon receipt of a reading command, will be explained with reference to FIG. 3. The reading control process is performed by the CPU 11 in accordance with the program. For example, the reading command is inputted by the user via the user interface 60 or inputted from the external apparatus 300 via the communication unit 70. Performing the reading control process by the controller 10 allows the scanner device 1 to convey each document from the feed tray one by one and to read it until all of the documents disposed on the feed tray are conveyed and read. When the motor temperature θ is high, the scanner device 1 temporarily stops the conveyance of the document.

When starting the reading control process, the controller 10 waits until a document is disposed on the feed tray (S210). Whether or not the document is disposed on the feed tray is judged by the controller 10 based on an input signal from an unillustrated sensor.

When the document is disposed on the feed tray (S210: Yes), the controller 10 starts a temperature storing process depicted in FIGS. 4A to 4C in parallel with the reading control process (S220). After that, the controller 10 judges whether or not the current motor temperature θ is less than an upper temperature θlim determined in advance (S230). The current motor temperature θ can be calculated as described above on the basis of the motor temperature θp and the time Tp in the temperature data stored in the NVRAM 17 and the current time T clocked by the internal clock 110. When the controller 10 judges that the current motor temperature θ is less than the upper temperature θlim (S230: Yes), the controller 10 executes an ADF reading process (S250).

The ADF reading process is a process in which each document disposed on the feed tray is conveyed and read. In the ADF reading process, the controller 10 controls the conveyance motor 40 so that the conveyance unit 30 separates each document in the feed tray one by one and conveys the separated document as the reading target to the discharge tray. Further, the controller 10 controls the reading unit 20 to read each line of the document and to obtain the read image data for each line of the document.

After the ADF reading process, the controller 10 judges whether or not a document to be subsequently processed is disposed on the feed tray (S260). When the controller 10 judges that the document to be subsequently processed is disposed on the feed tray (S260: Yes), the process proceeds to S230. When the controller 10 judges that no document to be subsequently processed is disposed on the feed tray (S260: No), the controller 10 completes the reading control process.

In S230, the controller 10 judges whether or not the current motor temperature θ is less than the upper temperature θlim. In the temperature storing process, the controller 10 calculates the motor temperature θ when the conveyance motor 40 is stopped upon completion of the ADF reading process (S380). The controller 10 updates the motor temperature θp and the time Tp stored in the NVRAM 17 to the motor temperature θ and the calculation time T obtained in S380 (S390). The current motor temperature θ can be calculated from the motor temperature θp and the time Tp at the time of stoppage of the conveyance motor 40 and the current time T. Or, the current motor temperature θ may be calculated at the end of the temperature storing process on the basis of the motor temperature θ and the time T stored in the RAM 15. When the controller 10 judges that the current motor temperature θ is less than the upper temperature θlim (S230: Yes), the controller 10 performs the ADF reading process to convey and read the document to be subsequently processed (S250).

When the controller 10 judges in S230 that the current motor temperature θ is not less than the upper temperature θlim (S230: No), the controller 10 waits until the motor temperature θ is less than the upper temperature θlim. When the controller 10 judges that the motor temperature θ is less than the upper temperature θlim (S230: Yes), the controller 10 executes the ADF reading process (S250).

As described above, when the motor temperature is high, the controller 10 does not execute the ADF reading process successively even when the document(s) to be subsequently processed is/are in the feed tray. Namely, when the motor temperature is high, the controller 10 executes the ADF reading process for each of the documents disposed in the feed tray one by one.

Next, an explanation will be made about details of the temperature storing process executed by the controller 10 with reference to FIGS. 4A to 4C, and 5. When starting the temperature storing process, the controller 10 waits until driving of the conveyance motor 40 starts along with the start of the ADF reading process. When the driving of the conveyance motor 40 starts, the controller 10 calculates the current motor temperature θ on the basis of the motor temperature θp and the time Tp in the temperature data stored in the NVRAM 17 and the current time T. After that, the controller 10 temporarily stores the calculated motor temperature θ and the calculation time T in the RAM 15 (S310). The motor temperature θ and the calculation time T temporarily stored in the RAM 15 are to be referred to as a motor temperature θb and its calculation time Tb obtained in the last calculation, when the controller 10 calculates the motor temperature next time.

Figure 4A:
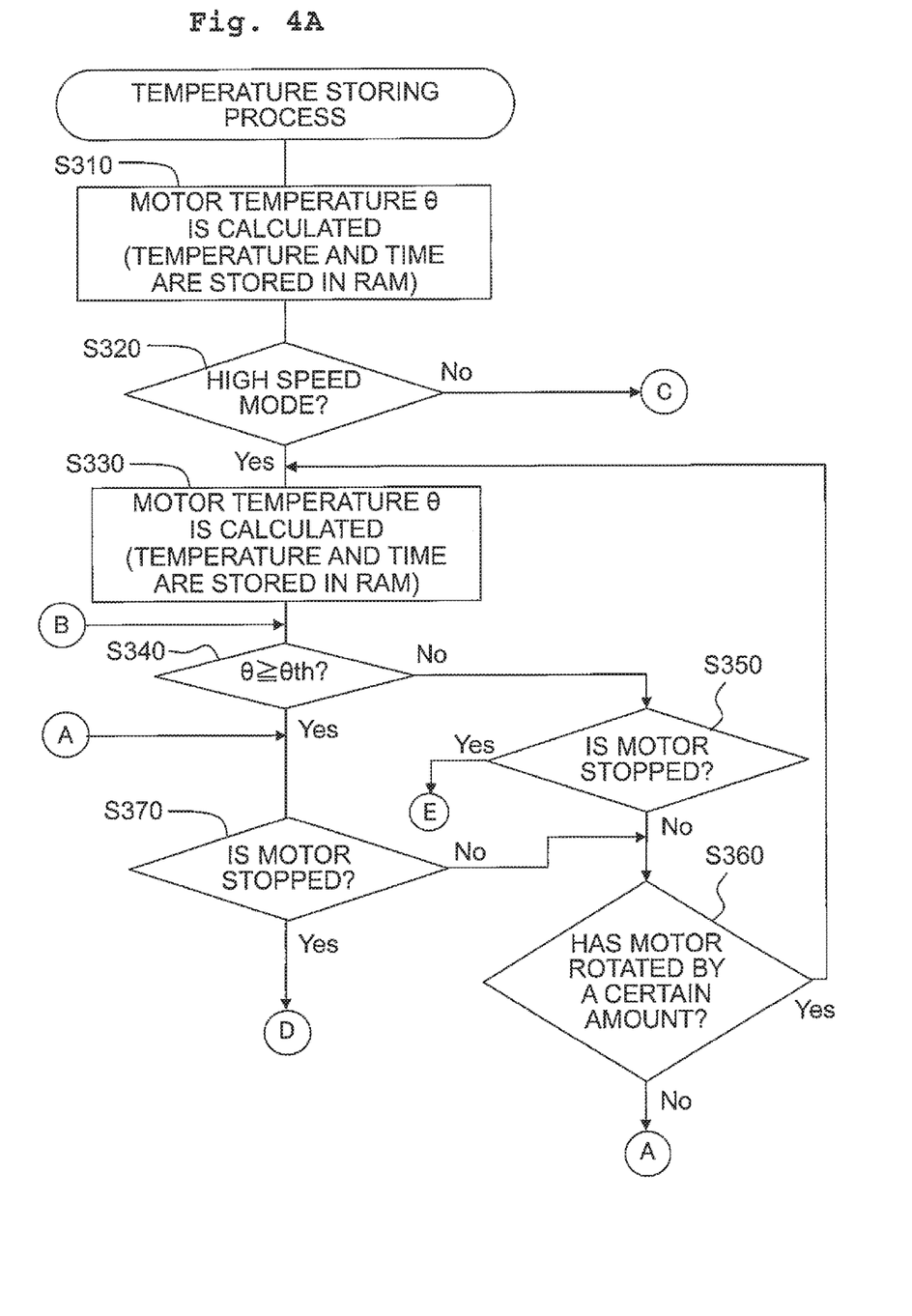
FIGS. 4A to 4C illustrate a flowchart of a temperature storing process executed by the controller.

Subsequently, the controller 10 judges which of a high speed mode and a low speed mode is used in the ADF reading process executed based on the reading command. When the reading command commanding the reading of document at high speed is inputted, the controller 10 executes the ADF reading process under the high speed mode. When executing the ADF reading process under the high speed mode, the controller 10 controls the driving circuit 50 to drive the conveyance motor 40 at high speed and controls the conveyance unit 30 to convey the document at high speed. When the reading command commanding the reading of document at low speed is inputted, the controller 10 executes the ADF reading process under the low speed mode. When executing the ADF reading process under the low speed mode, the controller 10 controls the driving circuit 50 to drive the conveyance motor 40 at low speed and controls the conveyance unit 30 to convey the document at low speed.

In the ADF reading process under the high speed mode, the reading time per one document is shorter than that of the ADF reading process under the low speed mode. The quality of the read image obtained under the high speed mode, however, is lower than that obtained under the low speed mode. The high speed mode is chosen, for example, when the user does not require high quality of image data. The low speed mode is chosen, for example, when the user requires high quality of image data.

When the controller 10 judges that the ADF reading process under the high speed mode is executed (S320: Yes), the process proceeds to S330. When the controller 10 judges that the ADF reading process under the low speed mode is executed (S320: No), the process proceeds to S510 (see FIG. 5).

In S330, the controller 10 calculates the current motor temperature $\theta$ on the basis of the motor temperature $\theta b$ obtained in the last calculation which has been stored in the RAM 15 and a rotation amount $\Delta R$ of the conveyance motor 40 obtained after the last calculation before the present time. In S330, the current motor temperature $\theta$ can be calculated in accordance with, for example, the formula $\theta=\theta b+A\times\Delta R$. A coefficient A is an increase in motor temperature per unit rotation amount. A value ($A\times\Delta R$) corresponds to an increase $\Delta\theta$ in motor temperature after the last calculation. The controller 10 temporarily stores the motor temperature $\theta$ thus obtained and its calculation time T in the RAM 15.

After that, the controller 10 judges whether or not the current motor temperature $\theta$ is not less than a predetermined threshold temperature $\theta th$ (S340). The threshold temperature $\theta th$ is an upper limit of a fluctuation range of atmospheric temperature. For example, the threshold temperature $\theta th$ is 40 degrees Celsius. The scanner device 1 is typically used indoors, and thus the atmospheric temperature, in which the scanner device 1 is used, hardly exceeds 40 degrees Celsius.

When the controller 10 judges that the current motor temperature $\theta$ is not less than the threshold temperature $\theta th$ (S340: Yes), the process proceeds to S370. When the controller 10 judges that the current motor temperature $\theta$ is less than the threshold temperature $\theta th$ (S340: No), the process proceeds to S350.

In S350, the controller 10 judges whether or not the conveyance motor 40 is stopped. When the controller 10 judges that the conveyance motor 40 is stopped (S350: Yes), the process proceeds to S400. When the controller 10 judges that the conveyance motor 40 is not stopped (S350: No), the process proceeds to S360.

In S360, the controller 10 judges whether or not the conveyance motor 40 has rotated by a certain amount after the last calculation of the motor temperature $\theta$. When the controller 10 judges that the conveyance motor 40 has not rotated by the certain amount (S360: No), the process proceeds to S370. When the controller 10 judges that the conveyance motor 40 has rotated by the certain amount (S360: Yes), the process proceeds to S330. In S330, the controller 10 recalculates the motor temperature $\theta$ and stores the recalculated motor temperature $\theta$ in the RAM 15. Then, the controller 10 judges whether or not the recalculated motor temperature $\theta$ is not less than the threshold temperature $\theta th$ (S340).

In S370, the controller 10 judges whether or not the conveyance motor 40 is stopped. When the controller 10 judges that the conveyance motor 40 is not stopped (S370: No), the process proceeds to S360. When the controller 10 judges that the conveyance motor 40 is stopped (S370: Yes), the process proceeds to S380.

In S380, the controller 10 calculates the current motor temperature $\theta$ in the similar manner as S330, and then temporarily stores the calculated motor temperature $\theta$ and the calculation time T in the RAM 15. Further, the controller 10 writes, in the NVRAM 17, the motor temperature $\theta$ calculated in S380 and its calculation time T as the motor temperature $\theta p$ and the time Tp respectively. Accordingly, the temperature data stored in the NVRAM 17 is updated (S390). After that, the process proceeds to S400.

As described above, the controller 10 calculates the motor temperature $\theta$, every time the conveyance motor 40 rotates by the certain amount, during the period of time after the driving of the conveyance motor 40 starts before the conveyance motor 40 is stopped (S330). When the conveyance motor 40 is stopped, the controller 10 calculates the motor temperature $\theta$ at that point in time (S380). Then, the controller 10 temporarily stores the calculated motor temperature $\theta$ and the calculation time T in the RAM 15 (S330, S380). When the motor temperature $\theta$ is not less than the threshold temperature $\theta th$ (S340: Yes), the controller 10 writes, in the NVRAM 17, the motor temperature $\theta$ and the time T at the time of stoppage of the conveyance motor 40, as the motor temperature $\theta p$ and the time Tp respectively (S390). The motor temperature $\theta p$ corresponds to a peak temperature of the conveyance motor 40.

Figure 5:
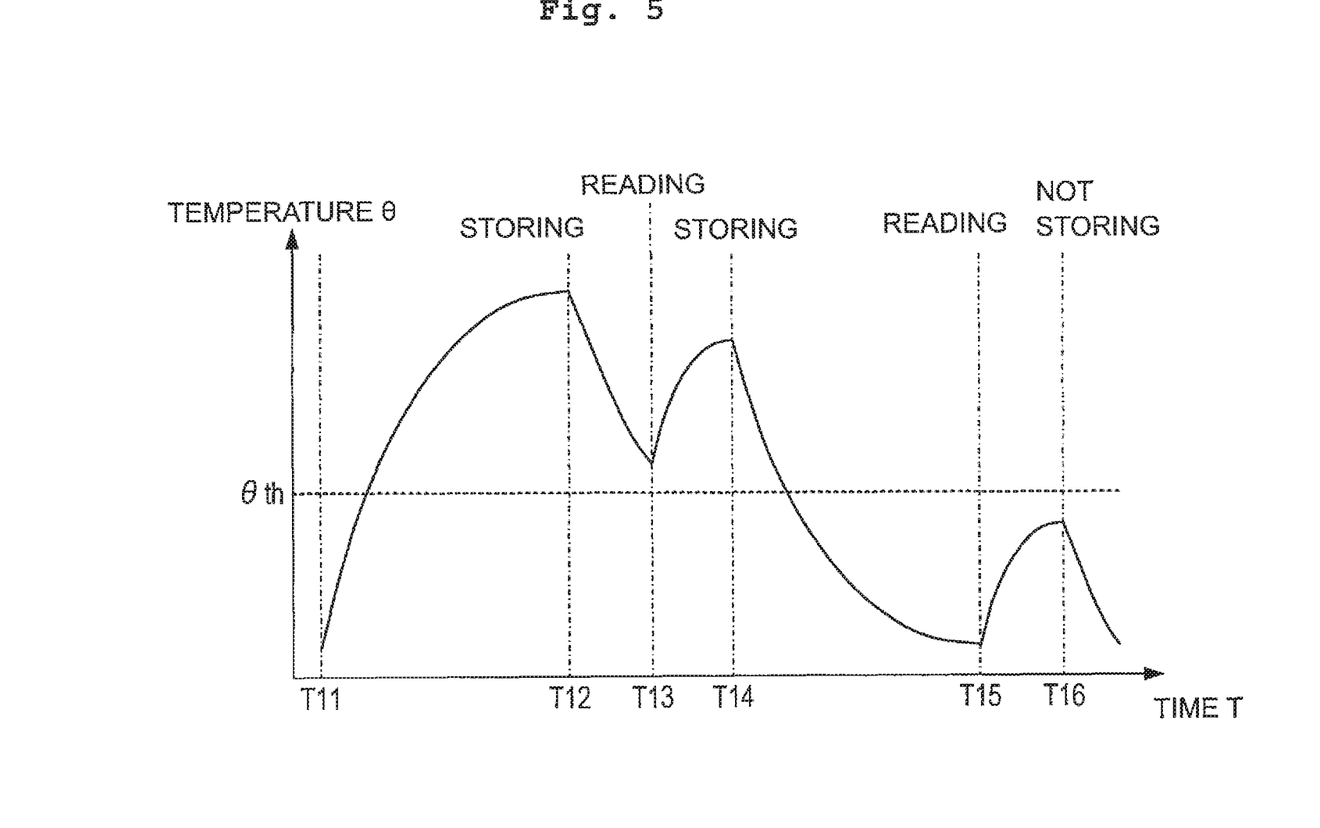
FIG. 5 is a graph showing the correspondence relation between a temperature change and an apparatus state.

As depicted in FIG. 5, the motor temperature $\theta$ increases with generation of heat from a driving start point T11 of the conveyance motor 40, reaches a peak at a stop point T12 of the conveyance motor 40, and decreases afterward. In this embodiment, the motor temperature $\theta$ and the calculation time T obtained at the stop point T12 of the conveyance motor 40 are stored, in the NVRAM 17, as the motor temperature $\theta p$ and the time Tp respectively.

Figure 4B:
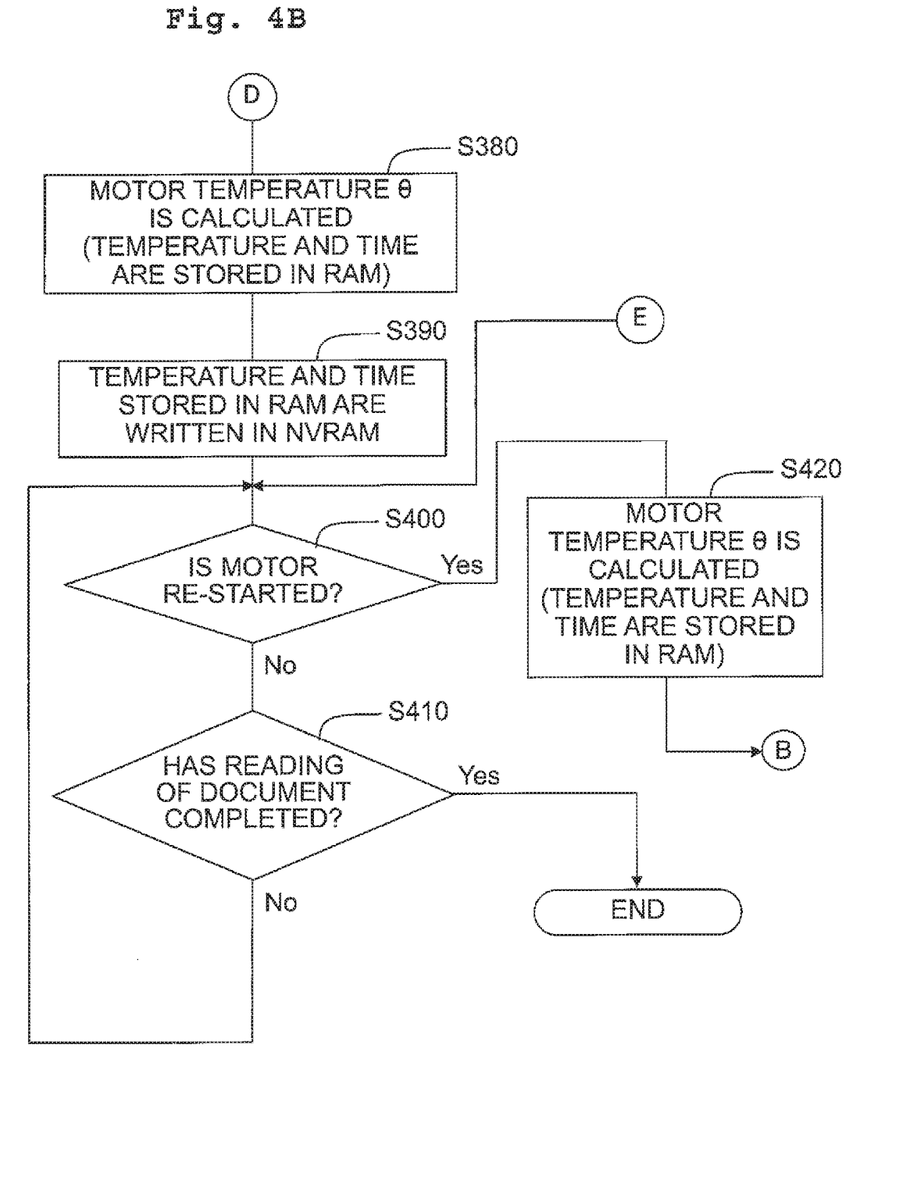

In S400, the controller 10 judges whether or not the driving of the conveyance motor 40 is restarted. When the controller 10 judges that the driving of the conveyance unit 40 is not restarted (S400: No), the controller 10 judges whether or not the reading control process is completed (S410). When the controller 10 judges that the reading control process is not completed (S410: No), the process proceeds to S400. When the controller 10 judges that the reading of document and the reading control process are completed (S410: Yes), the controller 10 completes the temperature storing process.

In S400, when the controller 10 judges that the driving of the conveyance motor 40 is restarted, the controller 10 calculates the motor temperature $\theta$ at the time of restart, and temporarily stores the calculated motor temperature $\theta$ and the calculation time T in the RAM 15 (S420). In S420, the controller 10 can calculate the motor temperature $\theta$ at the time of restart in accordance with the formula $\theta=\theta p-K\times\Delta T$ on the basis of the motor temperature $\theta p$ and the time Tp in the temperature data stored in the NVRAM 17 and the current time T clocked by the internal clock 110. Or, the motor temperature $\theta$ can be calculated in accordance with the function F. In S420, the controller 10 can calculate the motor temperature $\theta$ at the time of restart on the basis of the motor temperature $\theta b$ and the time Tb stored in the RAM 15 instead of the motor temperature $\theta p$ and the time Tp in the temperature data. After S420, the controller 10 executes processes after S340 to calculate the motor temperature $\theta$ every time the conveyance motor 40 rotates by the certain amount.

As described above, as shown in FIG. 5, the controller 10 reads the motor temperature $\theta p$ and the time Tp from the NVRAM 17 at time points T11, T13, and T15 at which the driving of the conveyance motor 40 is started or restarted, and calculates the motor temperature $\theta$ at each of the time points. During the driving period of the conveyance motor 40, the controller 10 calculates the current motor temperature $\theta$ every time the conveyance motor 40 rotates by the certain amount. When the motor temperature $\theta$ is not less than the threshold temperature $\theta th$, the controller 10 calculates the motor temperature $\theta$ at time points T12 and T14 at which the driving of the conveyance motor 40 is stopped even when the conveyance motor 40 fails to rotate by the certain amount. Then, the controller 10 updates the motor temperature θp and the time Tp stored in the NVRAM 17. When the motor temperature θ is less than the threshold temperature θth, the controller 10 does not update the motor temperature θp and the time Tp stored in the NVRAM 17 at the time point T16 at which the driving of the conveyance motor 40 is stopped.

Figure 4C:
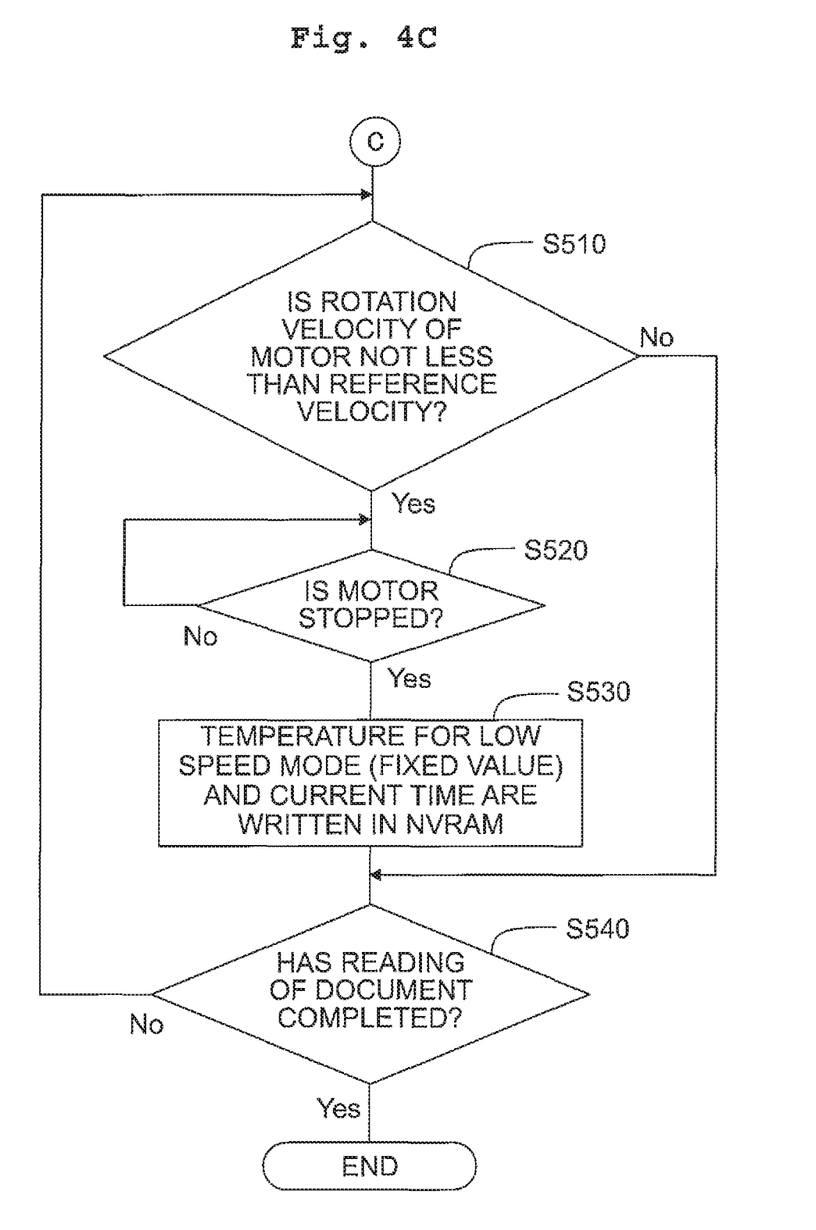

In addition to the above, the controller 10 judges in S510, which is performed during the ADF reading process under the low speed mode, whether or not a rotation velocity of the conveyance motor 40 is not less than a predetermined reference velocity. When the controller 10 judges that the rotation velocity of the conveyance motor 40 is less than the reference velocity (S510: No), the controller 10 judges whether or not the reading of document and the reading control process are completed (S540). When the controller 10 judges that the reading control process is not completed (S540: No), the process proceeds to S510 again. In S510, the controller 10 waits until the rotation velocity of the conveyance motor 40 is not less than the reference velocity or the reading control process is completed (S510, S540).

When the rotation velocity of the conveyance motor 40 is not less than the reference velocity (S510: Yes), and when the conveyance motor 40 stops after S510 (S520: Yes), the controller 10 updates the temperature data stored in the NVRAM 17 by writing, in the NVRAM 17, the temperature at the low speed and the current time as the motor temperature θp and the time Tp (S530). The temperature at the low speed is a fixed value, for example, 50 degrees Celsius. After that, the process proceeds to S540. In S540, when the controller 10 judges that the reading control process is not completed (S540: No), the process proceeds to S510.

As described above, in the ADF reading process under the low speed mode, only when the rotation velocity of the conveyance motor 40 is not less than the reference velocity during the driving period of the conveyance motor 40, the controller 10 writes, in the NVRAM 17, the temperature for the low speed mode and the time in a state that the conveyance motor 40 is stopped. The controller 10 performs this operation every time the conveyance motor 40 stops. When the reading of document is completed (S540: Yes), the controller 10 completes the temperature storing process.

Figure 6A:
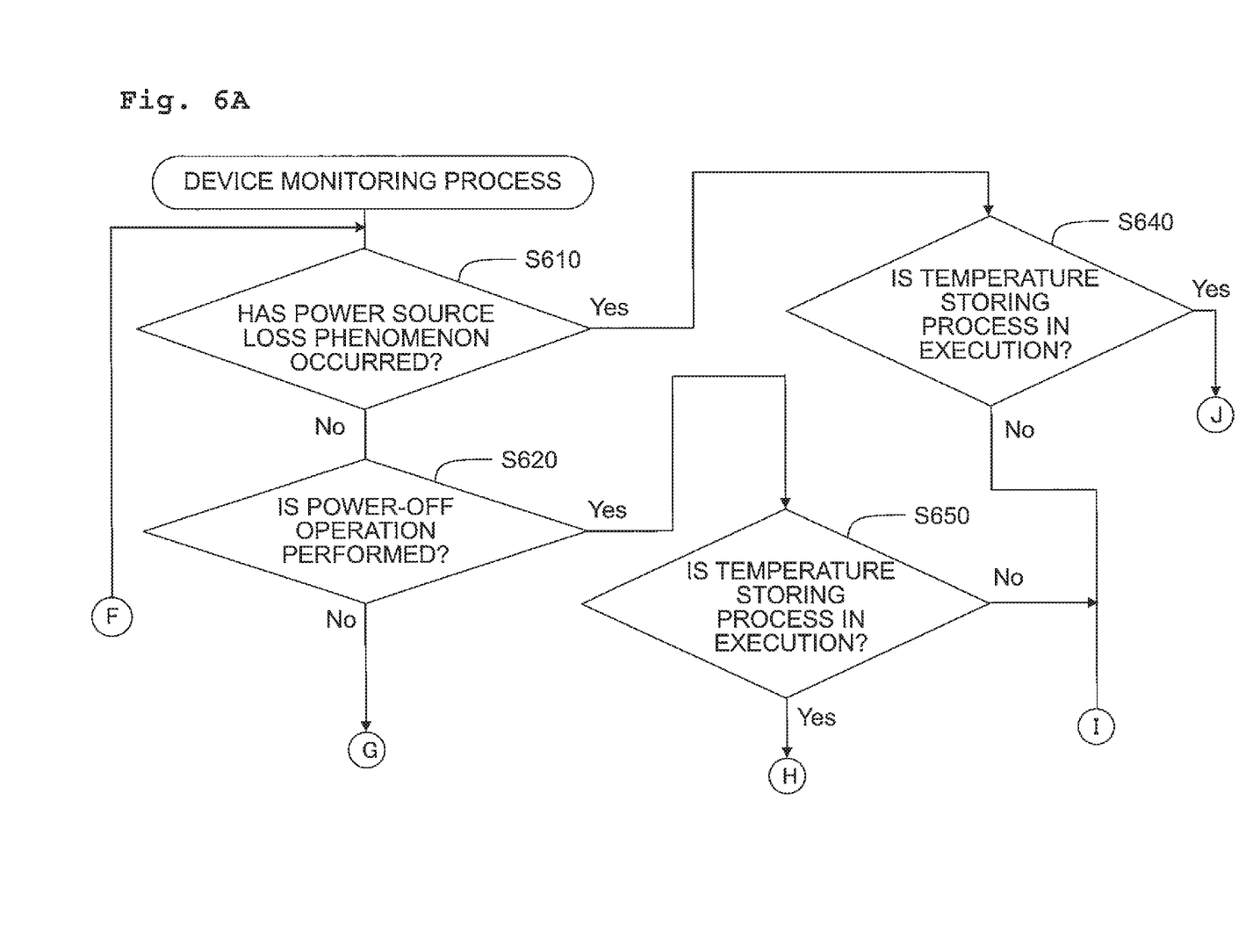
FIGS. 6A to 6C illustrate a flowchart of a device monitoring process executed by the controller.
Figure 6B:
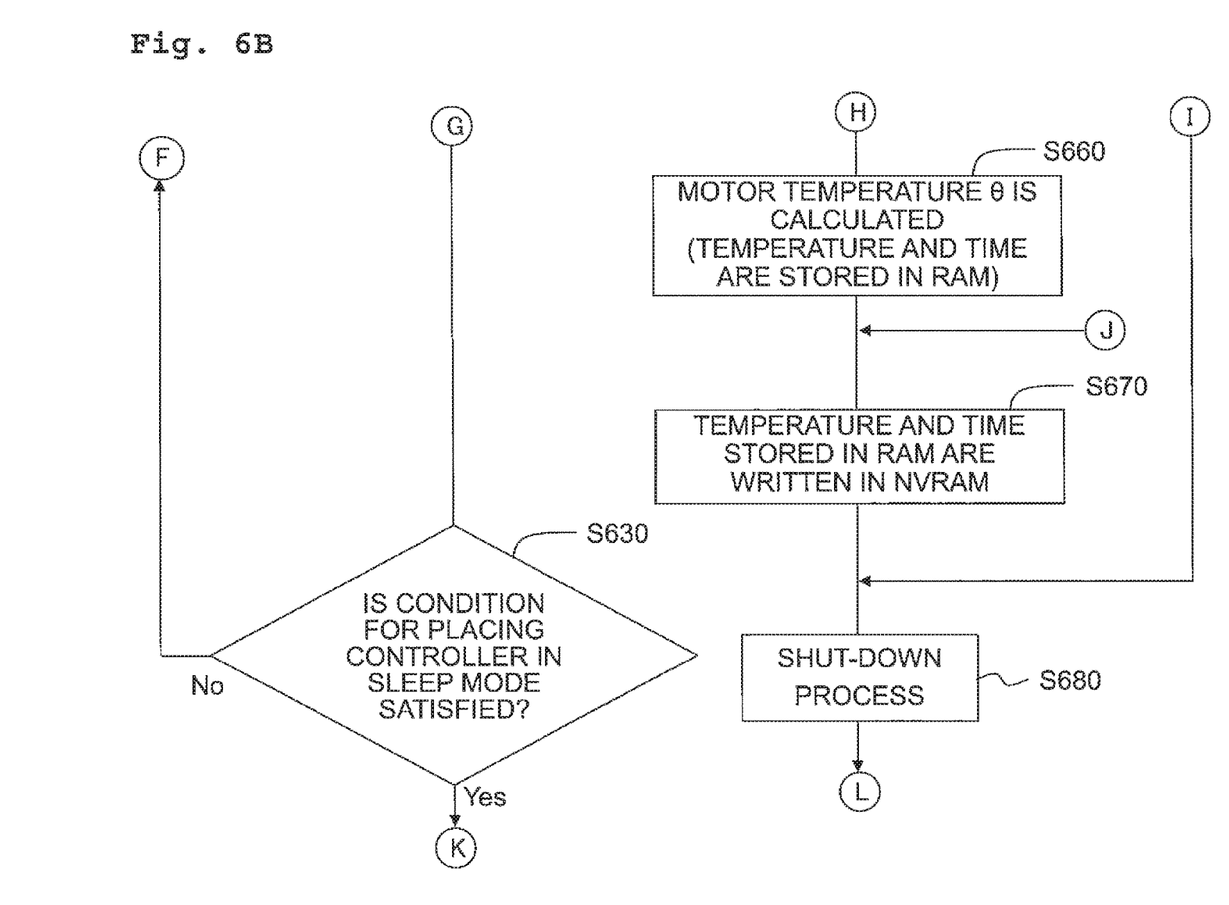
Figure 6C:
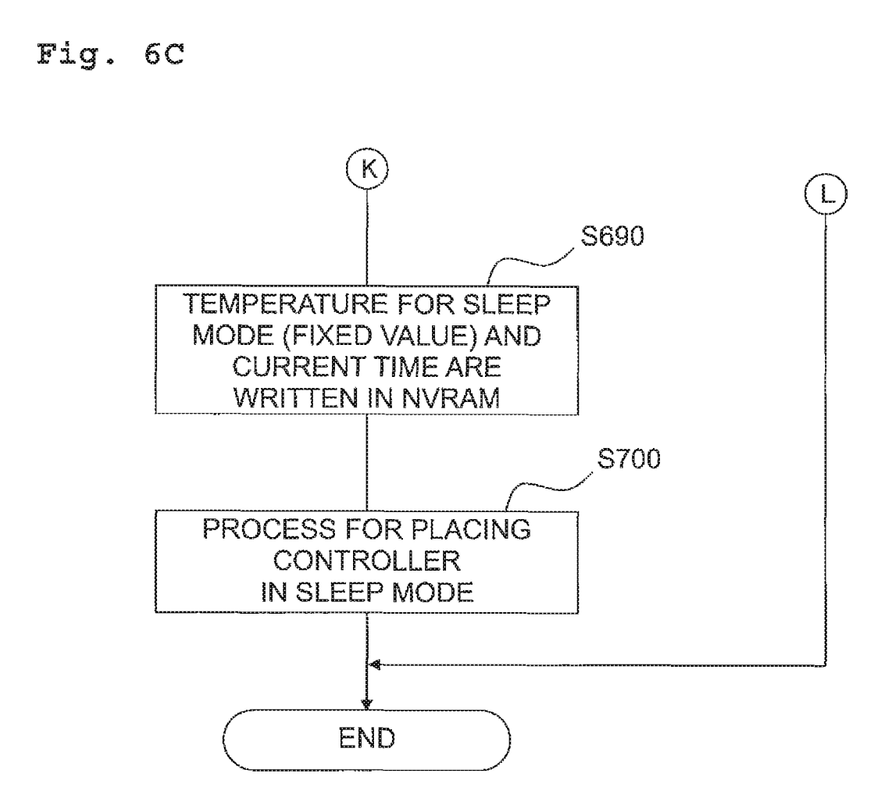

Subsequently, an explanation will be made about details of a device monitoring process with reference to FIGS. 6A to 6C. The device monitoring process is started by the controller 10 when the controller 10 is activated or recovered from the sleep mode. When starting the device monitoring process, the controller 10 waits until a power source loss phenomenon occurs (S610), a power-off operation for the power switch 80 is performed (S620), or a condition for placing the controller 10 in the sleep mode is satisfied (S630).

The power source loss phenomenon means a phenomenon in which power supply from the power plug 100 to the power unit 90 abnormally stops. The power source loss phenomenon is caused, for example, by an accident in which the power plug 100 is yanked out of the socket 200, power interruption, and an accident in which a breaker is thrown. A circuit (not depicted) which can detect the power source loss phenomenon is incorporated into the power unit 90. A detection signal of the circuit is inputted to the controller 10. The power source loss phenomenon can be detected, for example, by monitoring the input from the power plug 100 to the power unit 90.

The power unit 90 of this embodiment includes a built-in capacitor 91, which functions as a temporary buckup power source. Thus, when the power source loss phenomenon occurs, power supply from the power unit 90 to the controller 10 stops after elapse of the time which corresponds to capacitance of the capacitor. When power supply stops, the controller 10 stops and data in the RAM 15 disappears.

When the power source loss phenomenon occurs (S610: Yes), the controller 10 judges whether or not the temperature storing process depicted in FIGS. 4A to 4C is in execution. When the controller 10 judges that the temperature storing process is in execution (S640: Yes), the process proceeds to S670. In S670, the controller 10 updates the temperature data stored in the NVRAM 17 by writing, in the NVRAM 17, the motor temperature θ and the calculation time T, which have been temporarily stored in the RAM 15 in the temperature storing process, as the motor temperature θp and the time Tp. Here, the controller 10 writes the latest motor temperature θ calculated most recently and the calculation time T in the NVRAM 17. After performing a necessary shut-down process (S680), the controller 10 completes the device monitoring process. The controller 10 may be configured as follows. Namely, when the conveyance motor 40 is stopped at the time of occurrence of the power source loss phenomenon, the controller 10 does not execute S670 even in execution of the temperature storing process.

When the controller judges that the temperature storing process is not in execution at the time of occurrence of the power source loss phenomenon (S640: No), the controller 10 performs the necessary shut-down process (S680) and then completes the device monitoring process.

When the controller 10 detects the power-off operation for the power switch 80 based on the power on/off signal inputted from the power switch 80 (S620: Yes), the controller 10 judges whether or not the temperature storing process is in execution (S650). When the controller 10 judges that the temperature storing process is not in execution (S650: No), the controller 10 performs the necessary shut down process (S680), completes the device monitoring process, and stops the operation thereof. Then, the data stored in the RAM 15 disappears.

When the controller 10 judges in S650 that the temperature storing process is in execution, the controller 10 calculates the current motor temperature θ and temporarily stores the calculated motor temperature θ and its calculation time T in the RAM 15 (S660). When the conveyance motor 40 is in motion, the controller 10 can calculate the motor temperature θ in a similar manner as S330. When the conveyance motor 40 is stopped, the controller 10 can calculate the motor temperature θ in a similar manner as S420.

After that, the process proceeds to S670. In S670, the controller 10 updates the temperature data stored in the NVRAM 17 by writing, in the NVRAM 17, the calculated motor temperature θ and the calculation time T as the motor temperature θp and the time Tp. After the updating process, the controller 10 performs the necessary shutdown process (S680), completes the device monitoring process, and stops the operation thereof. The controller 10 may be configured as follows. Namely, when the conveyance motor 40 is stopped at the point in time at which the power-off operation for the power switch 80 is performed, the controller 10 does not perform S660 and S670 even in execution of the temperature storing process.

When the controller 10 judges that the condition for placing the controller 10 in the sleep mode is satisfied (S630: Yes), the process proceeds to S690. In S690, the controller 10 updates the temperature data stored in the NVRAM 17 by writing, in the NVRAM 17, a predetermined temperature for the sleep mode and the current time as the motor temperature θp and the time Tp. When the controller 10 is placed in the sleep mode, substantial time has elapsed after stoppage of the conveyance motor 40. Thus, the temperature for the sleep mode may be 40 degrees Celsius which is the upper limit of the fluctuation range of atmospheric temperature.

After S690, the controller 10 performs a process for placing the controller 10 in the sleep mode (S700) and completes the device monitoring process. In the sleep mode, the controller 10 is stopped and the data in the RAM 15 disappears.

In the above description, the configuration of the scanner device 1 according to this embodiment has been explained. According to the scanner device 1 in this embodiment, the controller 10 calculates a motor temperature on the basis of rotation of the conveyance motor 40. When the state of the conveyance motor 40 is switched from the driven state to the stopped state, the controller 10 calculates the motor temperature θ at the time of the switch operation (S380) and writes, in the NVRAM 17, the calculated motor temperature θ as the peak motor temperature θp, together with the absolute time T at the time of the calculation (S390).

The temperature change after stoppage of the motor can be easily calculated based on the time elapsed after the peak motor temperature θp. Thus, the scanner device 1 allows information of the motor temperature θp and the time Tp, which is required to accurately calculate the motor temperature θ after the power source loss phenomenon, to be stored in the NVRAM 17 appropriately while reducing the number of writing times in the NVRAM 17. Namely, in this embodiment, it is possible to reduce a temperature calculation error, which is caused when the scanner device 1 recovers from sudden power source loss.

In addition to the above, in this embodiment, when the conveyance motor 40 is driven, the controller 10 calculates the motor temperature θ every time the conveyance motor 40 rotates by the certain amount (S330). When the state of the conveyance motor 40 is switched from the driven state to the stopped state, the controller 10 calculates the motor temperature θ at the time of the switch operation even when the conveyance motor 40 fails to rotate by the certain amount (S380).

When the power source loss phenomenon occurs, the controller 10 writes, in the NVRAM 17, the latest motor temperature θ calculated most recently and its calculation time T as the motor temperature θp and the time Tp (S670). When the power source loss phenomenon occurs suddenly, the controller 10 stops in a very short time from the power source loss. Thus, the time for calculating the motor temperature θ and writing it in the NVRAM 17 may be insufficient.

According to this embodiment, the calculation operation of the motor temperature θ without the writing operation in the NVRAM 17 is performed frequently (S330). When any power source loss phenomenon occurs, the motor temperature θ, which has been calculated in the calculation operation, is stored in the NVRAM 17 (S670). This configuration makes it possible to complete the writing of the motor temperature θ in the NVRAM 17 more quickly than the case in which the motor temperature θ is calculated after the occurrence of the power source loss phenomenon. Therefore, according to this embodiment, even when the power source loss phenomenon occurs with the conveyance motor 40 driven, the motor temperature θ can be appropriately stored in the NVRAM 17 such that a great error is not caused at the time of the temperature calculation after resumption of power.

According to this embodiment, it is possible to provide the scanner device 1 which can reduce the temperature calculation error, which is caused when the controller 10 is recovered from the sudden power source loss phenomenon. Further, according to this embodiment, only when the motor temperature θ is not less than the upper temperature θth of the atmospheric temperature at the time of the stoppage of the conveyance motor 40 (S340: Yes), the controller 10 stores the motor temperature θ at the time of stoppage of the conveyance motor 40 in the NVRAM 40 (S390). Reducing the number of times of data writing in the NVRAM 17 in accordance with such a manner elongates the service life of the NVRAM 17.

In addition to the above, according to this embodiment, when the power switch 80 is turned off, the controller 10 calculates the motor temperature θ (S660), writes the calculated motor temperature θ in the NVRAM 17 (S670), and then stops the operation thereof. Thus, the controller 10 can perform the writing operation of the motor temperature θ in the NVRAM 17 in accordance with an appropriate manner which depends on the power source loss phenomenon, the power-off operation for the power switch 80, or the like. This reduces the temperature calculation error, which is caused when the scanner device 1 is activated next time.

When the ADF reading process under the low speed mode is performed to drive the conveyance motor 40 at the low speed, the controller 10 does not calculate the motor temperature θ successively. Instead, the controller writes the fixed value (temperature for the low speed mode) in the NVRAM 17 at the time of stoppage of the motor (S530). Further, when the rotation velocity of the conveyance motor 40 under the low speed mode fails to reach the reference velocity, the controller 10 does not perform even the writing operation in the NVRAM 10. Therefore, the scanner device 1 can monitor the motor temperature θ efficiently.

In addition to the above, according to this embodiment, when the motor temperature θ is not less than the upper temperature θlim, the driving of the conveyance motor 40 is prohibited until the motor temperature θ is less than the upper temperature θlim (S230, S250). Driving the conveyance motor 40 under high temperature damages the motor itself and any other internal circuit in the scanner device 1, thereby reducing the service lives thereof. Further, when the casing surface of the scanner device 1 has high temperature, the user may feel uncomfortable with the heat. According to this embodiment, the useful scanner device 1 can be obtained while the above disadvantages are prevented.

In the above description, the embodiment of the present teaching has been explained. The present teaching, however, is not limited to the above embodiment and can adopt various aspects. For example, the present teaching is not limited to the scanner device 1 and can be applied to various electrical devices mounting a motor.

Although the motor temperature θ is calculated every time the conveyance motor 40 rotates by the certain amount in the above embodiment, the motor temperature θ may be calculated at regular time intervals. The amount of change in the motor temperature θ may be calculated from a current applied to the conveyance motor 40. Various methods are known as the method of calculating the motor temperature without any sensor. The scanner device 1 can use any known method of calculating the motor temperature.

In addition to the above, once the motor temperature θ exceeds the threshold temperature θth during the driving period of the conveyance motor 40, the controller 10 may perform "Yes" judgement in S340 until the conveyance motor 40 is stopped. Namely, once the motor temperature θ exceeds the threshold temperature θth during the driving period of the conveyance motor 40, the controller 10 may perform S380 and S390. The embodiment of the present teaching includes various aspects which are included in technical ideas specified by the following claims.

The correspondence or correlation between the terms is as follows. The scanner device 1 is an exemplary electrical device; the NVRAM 17 is an exemplary non-volatile storage; each of the processes of S310, S330 to S380, S420, and S660 executed by the controller 10 (CPU 11) is an exemplary temperature calculation process; each of the processes of S390, S510 to S530, and S670 is an exemplary temperature storing process; the process of S510 to S530 is an exemplary storing process under the low speed mode; the process S120 executed by the controller 10 (CPU 11) is an exemplary initial temperature calculation process; the process S130 is an exemplary initial temperature storing process; the process S230 executed by the controller 10 (CPU 11) is an exemplary prohibition process.

What is claimed is:

1. An electrical apparatus mounting a motor, comprising:
a controller;
an electrically data rewritable non-volatile storage; and
at least one other storage electrically distinct from the non-volatile storage,
wherein the controller is configured to execute:
a temperature calculation process in which:
in a case that the motor is in a driven state, the controller successively calculates a temperature of the motor based on rotation of the motor; and
in a case that a state of the motor is switched, in a switch operation, from the driven state to a stopped state, the controller calculates a temperature of the motor at the time of the switch operation based on rotation of the motor; and
a temperature storing process in which:
in a case that a controller stop phenomenon stopping an operation of the controller has occurred and the temperature calculation process is being executed when the controller stop phenomenon occurs, the controller stores, in the non-volatile storage, the temperature as a peak temperature, together with an absolute time clocked at the time of the temperature calculation performed most recently;
in a case that the temperature calculation process is not being executed when the controller stop phenomenon occurs, the controller does not store the temperature in the non-volatile storage; and
the controller is caused to store, in the at least one other storage without storing in the non-volatile storage, the temperature calculated while the motor is in the driven state.

2. The electrical apparatus according to claim 1, wherein in the case that the motor is in the driven state during the temperature calculation process, the controller is configured to successively calculate a temperature of the motor every time the motor rotates by a predetermined amount or at predetermined time intervals.

3. The electrical apparatus according to claim 1, wherein the temperature storing process includes a process in which the controller stores, in the storage, the temperature, which has been calculated at the time of the switch operation in the temperature calculation process, as the peak temperature, together with an absolute time clocked at the time of the switch operation.

4. The electrical apparatus according to claim 3, wherein in a case that the temperature of the motor calculated at the time of the switch operation or a temperature of the motor calculated before the switch operation exceeds an upper limit of an atmospheric temperature, the controller is configured to store, in the storage, the temperature calculated at the time of the switch operation in the temperature storing process.

5. The electrical apparatus according to claim 1, wherein the controller stop phenomenon includes a phenomenon in which the operation of the controller stops due to an abnormal stop of power supply from a power plug, which is configured to supply power to the electrical apparatus.

6. The electrical apparatus according to claim 1, wherein the controller stop phenomenon includes a phenomenon in which the operation of the controller stops due to an abnormal stop of power supply from a power plug, which is configured to supply power to the electrical apparatus and a phenomenon in which the operation of the controller stops in response to a power-off operation for a power switch of the electrical apparatus, and
wherein the temperature calculation process includes a process in which the controller calculates a temperature of the motor in response to the power-off operation for the power switch.

7. An electrical apparatus mounting a motor, comprising:
a controller; and
an electrically data rewritable non-volatile storage,
wherein the controller is configured to execute:
a temperature calculation process in which in a case that a state of the motor is switched, in a switch operation, from a driven state to a stopped state, the controller calculates a temperature of the motor based on rotation of the motor; and
a temperature storing process in which the controller stores, in the storage, the temperature, which has been calculated at the time of the switch operation in the temperature calculation process, as a peak temperature, together with an absolute time clocked at the time of the switch operation,
wherein the motor is driven under a low speed mode or a high speed mode,
in a case that the motor is driven under the low speed mode, the controller is configured not to execute the temperature calculation process; and
in a case that the motor is driven under the high speed mode, the controller is configured to execute the temperature calculation process, and
the temperature storing process includes a storing process under the low speed mode in which in a case that a state of the motor under the low speed mode is switched from the driven state to the stopped state, the controller stores, in the storage, a predetermined fixed temperature as the peak temperature, together with an absolute time clocked at the time of the switch operation.

8. The electrical apparatus according to claim 7, wherein in the case that the state of the motor under the low speed mode is switched from the driven state to the stopped state in a state that a rotation velocity of the motor in the driven state is not less than a certain velocity, the controller stores, in the storage, the predetermined fixed temperature as the peak temperature, together with an absolute time clocked at the time of the switch operation, in the storing process under the low speed mode.

9. The electrical apparatus according to claim 7, further comprising at least one other storage electrically distinct from the non-volatile storage,
- wherein in the temperature calculation process, in a case that the motor is in the driven state, the controller is configured to calculate the temperature of the motor based on rotation of the motor every time a specified condition is satisfied, and
- wherein in the temperature storing process, the controller determines whether the temperature, which has been calculated at the time of the switch operation in the temperature calculation process, is greater than or equal to a reference temperature;
- in a case that the temperature calculated at the time of the switch operation in the temperature calculation process is greater than or equal to the reference temperature, the controller stores, in the non-volatile storage, the temperature, which has been calculated at the time of the switch operation in the temperature calculation process, as the peak temperature, together with the absolute time clocked at the time of the switch operation;
- in a case that the temperature calculated at the time of the switch operation in the temperature calculation process is less than the reference temperature, the controller does not store the temperature in the non-volatile storage; and
- the controller stores, in the at least one other storage without storing in the non-volatile storage, the temperature calculated when the motor is in the driven state.

10. The electrical apparatus according to claim 9,
- wherein the controller is configured to further execute an initial temperature calculation process in which in a case that the controller is activated or a predetermined condition is satisfied after the activation of the controller, the controller calculates a current temperature of the motor as an initial temperature based on the peak temperature and the absolute time stored in the storage and a current absolute time, and
- the controller is configured to calculate a temperature of the motor based on the initial temperature in the temperature calculation process executed after the initial temperature calculation process.

11. The electrical apparatus according to claim 10, wherein the controller is configured to further execute an initial temperature storing process in which in the case that the controller is activated or the predetermined condition is satisfied after the activation of the controller, the controller stores, in the storage, the initial temperature calculated in the initial temperature calculation process as the peak temperature, together with an absolute time clocked at the time of the initial temperature calculation.

12. The electrical apparatus according to claim 9, wherein in a case that the temperature of the motor is not less than a reference value, the controller is configured to execute a prohibition process by which driving of the motor is prohibited.

* * * * *